Figure 1:
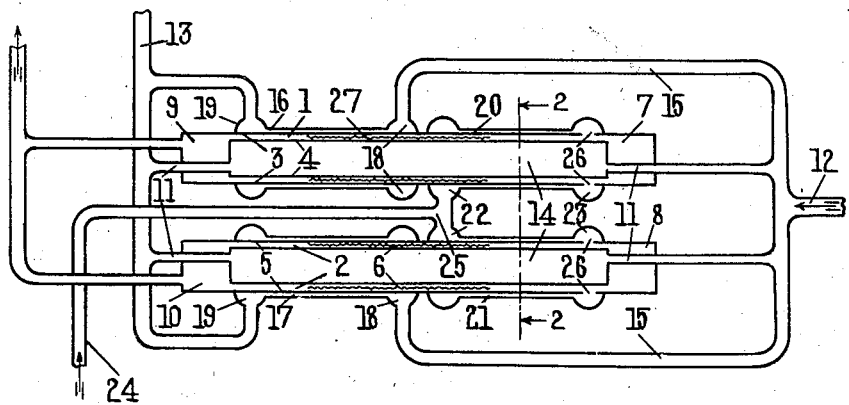

March 24, 1936.    H. DREYFUS    2,034,715
APPARATUS FOR PERFORMING CHEMICAL REACTIONS
Filed Aug. 22, 1932

INVENTOR
HENRY DREYFUS
BY
*Seltzer and* *[signature]*
ATTORNEYS

Patented Mar. 24, 1936

2,034,715

UNITED STATES PATENT OFFICE 2,034,715

APPARATUS FOR PERFORMING CHEMICAL REACTIONS

Henry Dreyfus, London, England

Application August 22, 1932, Serial No. 629,912
In Great Britain October 2, 1931

2 Claims. (Cl. 23—288)

This invention relates to apparatus for performing exothermic reactions, and particularly gas or vapor phase exothermic reactions with organic compounds.

It is well known that the carrying out of exothermic reactions in the gaseous or vapor phase is a matter of considerable difficulty on a large scale; in particular it is very difficult to prevent uneven reaction of the gases or vapors. Thus on an industrial scale local overheating or "hot spots" are very liable to occur over the area of catalyst belts, beds or layers, leading to uneven reaction and, in the case of organic reactions, to destructive decomposition. Hence, it is very difficult to achieve satisfactory conversions and the temperature control of the exothermic reaction is rendered particularly difficult.

According to the invention it has been found that the difficulties may be largely or entirely overcome by subjecting the gases or vapors to reaction in thin streams. By such means uniform temperatures are readily maintained and control of the reaction temperature is facilitated. The control of the reaction temperature may be effected in any convenient way, e. g. by any suitable heat exchange arrangements and/or by adding diluents such as nitrogen or steam to the reaction gases. The use of steam is particularly advantageous in the case of partial oxidations of organic compounds, e. g. the production of formaldehyde or acetaldehyde from the corresponding alcohols.

The thin stream of reaction gases or vapors may be produced in any convenient manner. For instance, tubes or other forms of reaction vessels or converters may be so constructed that the reaction gases or vapors traverse them in the form of a thin stream, sheet or the like or a plurality of such streams, sheets or the like. Preferably the gases or vapors are passed through a converter or reaction vessel so arranged that they pass therethrough in a number of thin streams or in one or more thin sheets or annuli. For instance, the converter or reaction vessel may comprise a number of walls, partitions or the like between which (or between which walls, partitions or the like and the shell of the vessel) the reaction gases or vapors pass in a number of fine streams, thin sheets or annuli. Such walls, partitions or the like may advantageously be hollow and serve as heat exchanging elements, suitable cooling liquids or fluids being supplied to them in any appropriate manner. Further, if it is necessary to supply heat to initiate the reaction, suitable heating liquids or fluids may be employed, to be replaced, if desired, by cooling fluids when the reaction has commenced.

The walls, partitions or the like may be arranged in any convenient way adapted to permit the reaction gases or vapors to pass in the thin streams, sheets or annuli. For instance, they may be spaced near to each other and/or to the outer shell of the vessel, e. g. about 1 inch apart or less. The walls, partitions or the like may be straight, curved or of circular or other closed form whereby the reaction gases may pass in the form of a thin sheet, annulus or the like or a plurality of such sheets or annuli. Conveniently the apparatus forming the reaction vessel or converter may take the form of a plurality of concentric pipes or the like placed one inside the other. The inner pipe of the apparatus or of any pair of adjacent pipes is of slightly smaller diameter than the pipe or the like surrounding it and fitted in any convenient way to leave a thin annular space between the two pipes or any pair of adjacent pipes, for instance a space of less than 1 inch, e. g. ½ to $\frac{1}{10}$ inch or less. Preferably the pipes, particularly the outer pipes of a series of concentric pipes where such is employed, are of large or relatively large diameter, e. g. 6 inches to 3 feet or more. Obviously pipes or the like of square or other section may be employed in place of circular pipes.

Heat exchanging elements supplied with any cooling or heating liquid or fluid may be placed in heat exchanging relationship with the annular spaces in any convenient way. For instance, the pipes forming the partitions between said spaces may themselves be formed with hollow walls to which the cooling liquid or fluid may be supplied.

The catalysts employed for any particular reaction may be disposed in or in contact with the fine streams in any convenient way, for instance in the form of a bed or a belt or layer or a plurality of such belts, beds or layers within the thin annular or other spaces hereinbefore referred to. If desired the catalysts may be coated upon or spread upon the walls, partitions or the like, or such walls, partitions or the like may themselves be formed of or lined with appropriate catalytic metals whether or not catalysts are otherwise present.

Figure 2:
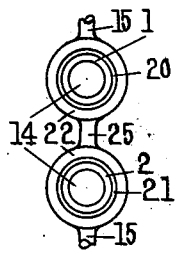

A convenient form of apparatus embodying the invention is illustrated diagrammatically in the drawing, in which Fig. 1 represents a longitudinal section through the apparatus, and Fig. 2 a sectional view along the line 2—2.

The apparatus comprises two narrow annular reaction spaces 1, 2, formed by the concentric pipes 3, 4 and 5, 6, and opening at their two ends into the annular inlet chambers 7, 8 and outlet chambers 9, 10 respectively. Through these inlet and outlet chambers pass pipes 11 communicating with the inlet 12 and outlet 13, through which a fluid heating or cooling medium can be passed as required into the central spaces 14 enclosed by the annular reaction spaces 1, 2. The heating or cooling medium can also pass through the pipes 15 to thin annular spaces 16, 17 concentric with and immediately outside the reaction spaces 1, 2, and extending about half the length thereof. At one end the spaces 16, 17 open into annular chambers 18, whereby the heating or cooling medium enters from the pipes 15, while at the other end similar chambers 19 are provided whereby the heating or cooling medium is led to the outlet 13.

The other half of the length of the reaction spaces 1, 2 is surrounded by similar annular spaces 20, 21, opening into annular inlet chambers 22 and outlet chambers 23. The inlet chambers 22 communicate with the reaction vapor inlet 24 by the pipe 25, while the outlet chambers 23 open into the annular spaces 1, 2 by the openings 26. The reaction spaces 1, 2 may contain a catalyst 27, such as a silver wire spiral or gauze, or they may be constructed of or lined with a catalyst such as silver or copper.

The vapors in passing through the narrow annular spaces 20, 21 are preheated before entering the reaction spaces 1, 2. In performing exothermic reactions it is usually advisable to preheat only to a very moderate extent, and the degree of preheating may conveniently be regulated by varying both the gas velocity and the position of the catalyst. Thus, if only a small length of catalyst is present in that part of the reaction space which is contiguous with the preheating space, a moderate degree only of preheating will be obtained. Since the narrow spaces and correspondingly large surfaces allow an efficient heat exchange to be effected, a highly efficient control over the reaction is thus made possible by the use of the invention.

If desired the several annular spaces may themselves be concentric, in which case apparatus such as that described in U. S. application S. No. 629,911 filed August 22, 1932, may be employed, with or without modification. Another type of apparatus that may very usefully be employed is illustrated in U. S. application S. No. 629,910 filed August 22, 1932, in which a number of separate annular reaction spaces are employed. The invention is, of course, in no way limited as to the number or arrangement of such annular reaction spaces, and the apparatus described above is to be regarded purely as an example of apparatus constructed according to the invention.

What I claim and desire to secure by Letters Patent is:—

1. Apparatus for use in exothermic gas and vapor phase reactions comprising concentric tubes bounding, respectively, a narrow annular reaction space, a narrow annular preheating space adjacent to and co-axial with at least part of the reaction space and communicating with the reaction space, and a channel for a cooling fluid having one wall in common with at least part of the reaction space.

2. Apparatus for use in exothermic gas and vapor phase reactions comprising concentric tubes bounding, respectively, a narrow annular reaction space, a narrow annular preheating space adjacent to and co-axial with at least part of the reaction space and communicating with the reaction space, and a narrow annular space also adjacent to and co-axial with at least part of the reaction space for passage of a cooling fluid.

HENRY DREYFUS.